Jan. 19, 1932.  L. C. DOANE  1,841,883
ADJUSTABLE HICKEY
Filed Jan. 20, 1930
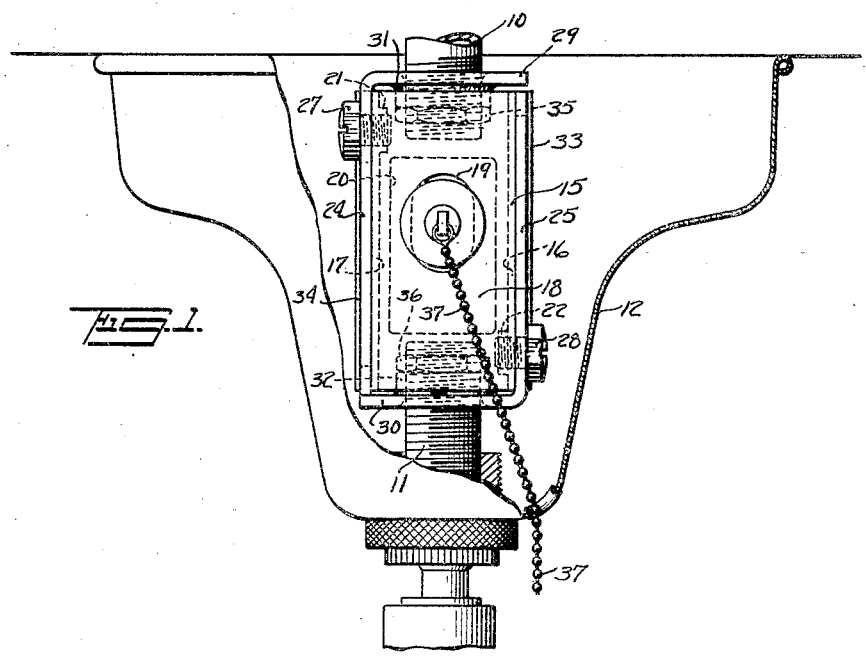
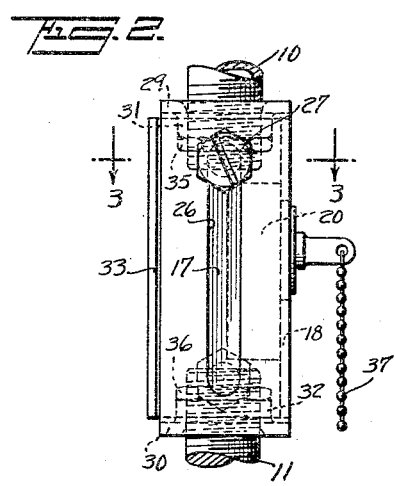
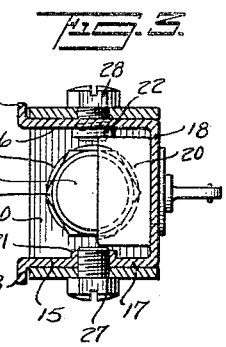
INVENTOR
*Leroy C. Doane*
BY
*Joel B. Liberman*
ATTORNEY Patented Jan. 19, 1932

1,841,883

UNITED STATES PATENT OFFICE

LEROY C. DOANE, OF MERIDEN, CONNECTICUT, ASSIGNOR TO THE MILLER COMPANY, OF MERIDEN, CONNECTICUT, A CORPORATION OF CONNECTICUT

ADJUSTABLE HICKEY

Application filed January 20, 1930. Serial No. 422,006.

The present invention relates to adjustable hickeys for lighting fixtures.

In mounting ceiling supported lighting fixtures, such as chandeliers, commercial lighting units, and the like, it is customary to employ a hickey to support the fixture from the stud in the outlet box, and the present invention relates to adjustable hickeys particularly designed for this purpose.

The present invention contemplates such a hickey made out of simple stampings of heavy gauge sheet metal arranged for easy assembly for ease of installation and for ease of adjustment. It is also contemplated that the hickey shall accommodate the switch, where one is employed for controlling the lighting unit.

Other and further objects will appear as the description proceeds.

The accompanying drawings show, for purposes of illustrating the present invention, one of the many embodiments in which it may take form, it being understood that the drawings are illustrative of the invention rather than limiting the same.

In these drawings:

Figure 1 is a sectional view with parts in elevation, showing the upper part of a lighting fixture and the adjustable hickey;

Figure 2 is a side elevational view of the adjustable hickey; and

Figure 3 is a section through the intermediate member of the adjustable hickey and taken on the line 3—3 of Figure 2.

A conventional outlet box stud or other fixture support is shown at 10 and a conventional suspension device for a fixture is indicated at 11. The canopy is shown at 12. The adjustable hickey, as here shown, comprises three sheet metal stampings and two screws. The intermediate member in the hickey is indicated at 15. It has two parallel side walls 16 and 17 and a connecting rear wall 18. The rear wall is apertured, as indicated at 19, to accommodate the canopy switch indicated at 20. The side walls 16 and 17 are provided with inwardly drawn tubular extensions 21 and 22 arranged on opposite ends of the opposite sides, as will be clear from Figure 1.

The adjustable hickey, as here shown, also comprises two L-shaped members 24 and 25. These L-shaped members are slotted, as indicated at 26, to receive screws 27 and 28, threaded into the tubular extensions 21 and 22. The shorter ends 29 and 30 of the L-shaped members have inwardly drawn tubular bosses or extensions 31 and 32. These bosses are threaded, as indicated, and are preferably provided with the proper sized thread to receive the stud 10 on the outlet box or the fixture suspension device. These threads are generally made of the same size and, hence, the hickey may be reversible.

The intermediate member and the L-shaped members are preferably made of heavy gauge sheet metal stamped to form and can, therefore, be made in a very inexpensive manner. The only assembly necessary is to place the L-shaped members alongside the intermediate member and insert the screws. The L-shaped members are slidably guided by the slot and screw and by the flanges 33 and 34 provided on the edges of the channel shaped intermediate member.

One can collapse the hickey to be short or may extend it to be almost three times its shortest length. It may be readily mounted on the outlet box and locked in place by a lock nut, as indicated at 35. The switch 20 is received through the open side of the intermediate member and is secured in place in the usual manner. The fixture suspension device 11 may be secured into the lower threaded hole and locked in place by a lock nut, as indicated at 36. These lock nuts may be readily placed and tightened, as one side of the intermediate member is open. The pull chain for the switch is indicated at 37.

From the foregoing it will be apparent that the present hickey is one which is well suited for the purpose, and one which can be easily installed and adjusted according to the depth of the canopy or other conditions which may be desired.

It is obvious that the invention may be embodied in many forms and constructions, and I wish it to be understood that the particular form shown is but one of the many forms. Various modifications and changes being possible, I do not limit myself in any way with respect thereto.

I claim:

1. A reversible hickey for lighting fixtures comprising, a vertical intermediate member having spaced sides each of which slidably carries an L-shaped member, the shorter ends of these L-shaped members overlying the ends of the intermediate member, the shorter end of each member having a threaded hole aligned with the corresponding hole in the shorter end of the other member, and separate clamping means for each slidable member whereby it may be independently adjusted.

2. A reversible hickey for lighting fixtures comprising, a vertical intermediate member with spaced parallel walls, L-shaped members whose longer side is substantially equal to the length of the intermediate member, each being slidably secured to each side wall and having a shorter end overlying an end of the intermediate member, the overlying ends each having aligned threaded holes.

3. A reversible hickey for lighting fixtures comprising, a vertical intermediate member with spaced parallel walls, a clamping screw threaded into each of said walls, and a slotted L-shaped member slidably carried by each screw and overlying an end of the intermediate member, the overlying ends each having aligned threaded holes, the length of the slots being substantially equal to the length of the intermediate member.

4. A hickey for lighting fixtures comprising, a channel shaped stamping having parallel side walls, spaced to accommodate a switch, and a connecting wall apertured to receive the switch, and a pair of slidably mounted L-shaped members whose longer sides are substantially equal to the length of the stamping and whose shorter sides are substantially equal to the width of the stamping, so as to overlie the ends thereof, said shorter sides having threaded holes to receive an outlet box stud or a threaded fixture suspension device.

5. A hickey for lighting fixtures comprising, a channel shaped stamping having parallel side walls, spaced to accommodate a switch, and a connecting wall apertured to receive the switch, and a pair of slidably mounted L-shaped members whose longer sides are substantially equal to the length of the stamping and whose shorter sides are substantially equal to the width of the stamping, so as to overlie the ends thereof, said shorter sides having threaded holes to receive an outlet box stud or a threaded fixture suspension device, the side of the stamping opposite the connecting wall being open to permit placing lock nuts on the stud and suspension device.

6. A hickey for lighting fixtures comprising, a channel shaped stamping having parallel side walls, spaced to accommodate a switch, and a connecting wall apertured to receive the switch, inwardly drawn threaded bosses in the side walls, a pair of L-shaped members whose longer sides are substantially equal to the length of the stamping and whose shorter sides are substantially equal to the width of the stamping, so as to overlie the ends thereof, said shorter sides having threaded holes to receive an outlet box stud or a threaded fixture suspension device, and clamping screws passing through slots in the longer sides and threaded into the bosses.

7. A reversible hickey for lighting fixtures comprising, an intermediate switch supporting member and a pair of reversely arranged slidably mounted members, each overlying an end of the intermediate member and having threaded holes for fixture suspension devices and outlet box studs, the intermediate member having an open side to receive a switch and to permit tightening lock nuts onto the ends of the devices passed through the threaded holes.

Signed at Meriden, in the county of New Haven and State of Connecticut, this 17th day of January, 1930.

LEROY C. DOANE.